(12) United States Patent
Mruthyunjaya

(10) Patent No.: US 10,136,075 B2
(45) Date of Patent: Nov. 20, 2018

(54) COMPENSATION CIRCUIT FOR AN X-RAY DETECTOR

(71) Applicant: Carestream Health, Inc., Rochester, NY (US)

(72) Inventor: Ravi K. Mruthyunjaya, Penfield, NY (US)

(73) Assignee: Carestream Health, Inc., Rochester, NY (US)

( * ) Notice: Subject to any disclaimer, the term of this patent is extended or adjusted under 35 U.S.C. 154(b) by 298 days.

(21) Appl. No.: 14/972,561

(22) Filed: Dec. 17, 2015

(65) Prior Publication Data

US 2016/0178759 A1 Jun. 23, 2016

Related U.S. Application Data

(60) Provisional application No. 62/092,880, filed on Dec. 17, 2014.

(51) Int. Cl.
*H04N 5/32* (2006.01)
(52) U.S. Cl.
CPC ..................... *H04N 5/32* (2013.01)
(58) Field of Classification Search
CPC ........................................................ H04N 5/32
USPC .................................................... 250/370.15
See application file for complete search history.

(56) References Cited

U.S. PATENT DOCUMENTS

| | | | |
|---|---|---|---|
| 6,407,390 B1 * | 6/2002 | Rozsa | G01T 1/202 250/363.01 |
| 6,852,966 B1 * | 2/2005 | Douma | H04B 10/6911 250/214 AG |
| 9,721,505 B2 * | 8/2017 | Chaji | G06F 1/3218 |
| 2007/0229428 A1 * | 10/2007 | Nakagawa | G09G 3/3233 345/92 |
| 2010/0177125 A1 * | 7/2010 | Miwa | G09G 3/3233 345/690 |
| 2013/0170620 A1 * | 7/2013 | Tredwell | G01T 1/2018 378/91 |
| 2015/0160352 A1 * | 6/2015 | Tredwell | G01T 1/175 378/98.8 |
| 2015/0236062 A1 * | 8/2015 | Chang | H01L 27/14616 257/57 |
| 2016/0041665 A1 * | 2/2016 | Gwon | G06F 3/0412 345/174 |
| 2016/0178759 A1 * | 6/2016 | Mruthyunjaya | H04N 5/32 250/370.15 |
| 2016/0178768 A1 * | 6/2016 | Tredwell | G01T 7/005 250/252.1 |
| 2016/0277695 A1 * | 9/2016 | Oguro | H04N 5/3698 |
| 2016/0282477 A1 * | 9/2016 | Mruthyunjaya | H01L 27/14643 |
| 2016/0284748 A1 * | 9/2016 | Mruthyunjaya | H04N 5/32 |

* cited by examiner

*Primary Examiner* — David Porta
*Assistant Examiner* — Gisselle Gutierrez

(57) ABSTRACT

A pixel circuit includes a voltage compensation circuit connected to a body terminal of the pixel's switching TFT to compensate for a decreasing threshold voltage drift of the TFT.

18 Claims, 4 Drawing Sheets

COMPENSATION CIRCUIT FOR AN X-RAY DETECTOR

CROSS REFERENCE TO RELATED APPLICATIONS

This application claims priority to U.S. Patent Application Ser. No. 62/092,880, filed Dec. 17, 2015, in the name of Mruthyunjaya, and entitled COMPENSATION CIRCUIT FOR AN X-RAY DETECTOR.

FIELD OF THE INVENTION

The subject matter disclosed herein relates to circuitry for reading out data from an array of pixels in a digital radiographic detector, in particular, to a compensation circuit that counterbalances a threshold voltage shift in a pixel's TFT switch.

BACKGROUND OF THE INVENTION

A digital radiographic detector may include an array of pixels. An exemplary unit passive pixel schematic diagram 300 is shown in FIG. 3. It includes one PIN photodiode 302 and one thin film transistor (TFT) 304. The PIN photodiode 302 stores charge proportional to the light exposure it receives as provided by an adjacent x-ray scintillator. The TFT 304 is used as a switch that transfers the charge from the PIN photodiode 302 onto a common column data line 306 which eventually is electrically connected to the detector's readout circuitry. The gate 308 for the TFT receives a control signal from an electrically connected common row select signal source where one or more rows can be accessed simultaneously.

A TFT in a passive pixel may use amorphous silicon (a-Si) technology. These TFTs are known to be stable with respect to optical illumination, environment, radiation and electrical stress. Oxide TFTs, such as Indium Gallium Zinc Oxide (IGZO), may show instability with respect to optical illumination, environment, radiation and electrical stress. One performance metric common to some oxide TFTs is a threshold voltage (VT) shift over time which influences the effective TFT turn on voltage. In the case of x-ray radiation instability, it has been shown that the VT will shift to the left (decrease) with increasing x-ray exposure over the life of the pixel.

A VT compensation circuit may be an effective way to compensate for VT shift due to environmental effects, such as temperature, and TFT process variability. An x-ray detector may include a TFT array over a large area panel which requires good uniformity and consistent performance. Oxide TFTs may show left VT shift dependence over increasing x-ray exposure, and this cumulative x-ray exposure may not be uniform across the detector's entire array of pixels over its lifetime. Having an in-pixel VT compensation circuit would be an effective way to reduce such a left VT shift.

The discussion above is merely provided for general background information and is not intended to be used as an aid in determining the scope of the claimed subject matter.

BRIEF DESCRIPTION OF THE INVENTION

In order to support a VT compensation circuit, the TFT used in an exemplary pixel circuit of a digital radiographic detector panel would require support for a fourth terminal, which may also be referred to herein as a body, bulk silicon, or substrate terminal. Driving a voltage onto the fourth terminal may impact the final effective VT of the TFT. Lowering the fourth terminal voltage will effectively shift the VT to the right (increase VT). Increasing the fourth terminal voltage will effectively shift the VT to the left (decrease VT).

In one embodiment, a pixel circuit includes a voltage compensation circuit electrically connected to a body terminal of the pixel's switching TFT to compensate for a decreasing threshold voltage shift of the TFT. An advantage that may be realized in the practice of some disclosed embodiments of the compensation circuit is output of more detailed x-ray images.

In one embodiment, a pixel circuit includes a photosensor for collecting photon induced charges. A controllable switch is electrically connected to the photosensor and to a dataline for transmitting a data signal to the dataline that is proportional to the amount of charge collected by the photosensor. A voltage compensation circuit is electrically connected to the switch to prevent a decrease of a voltage threshold of the controllable switch.

In another embodiment, a voltage compensation circuit includes a first TFT and a second TFT electrically connected in series between a first voltage source and a second voltage source. A third voltage source is electrically connected to the body of the second TFT. The gate and drain of the second TFT are shorted together and a node between the first and second TFTs may be used to provide a compensation voltage.

In another embodiment, an x-ray detector panel includes numerous pixels and associated pixel circuits. Each of the pixel circuits include a photosensor for collecting photon induced charges and a controllable switch for outputting a signal to a dataline that is proportional to the amount of charge collected by the photosensor. A voltage compensation circuit is electrically connected to the switch to deter a decrease of its voltage threshold.

The summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The drawings below are intended to be drawn neither to any precise scale with respect to relative size, angular relationship, relative position, or timing relationship, voltage bias relation, nor to any combinational relationship with respect to interchangeability, substitution, or representation of a required implementation.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
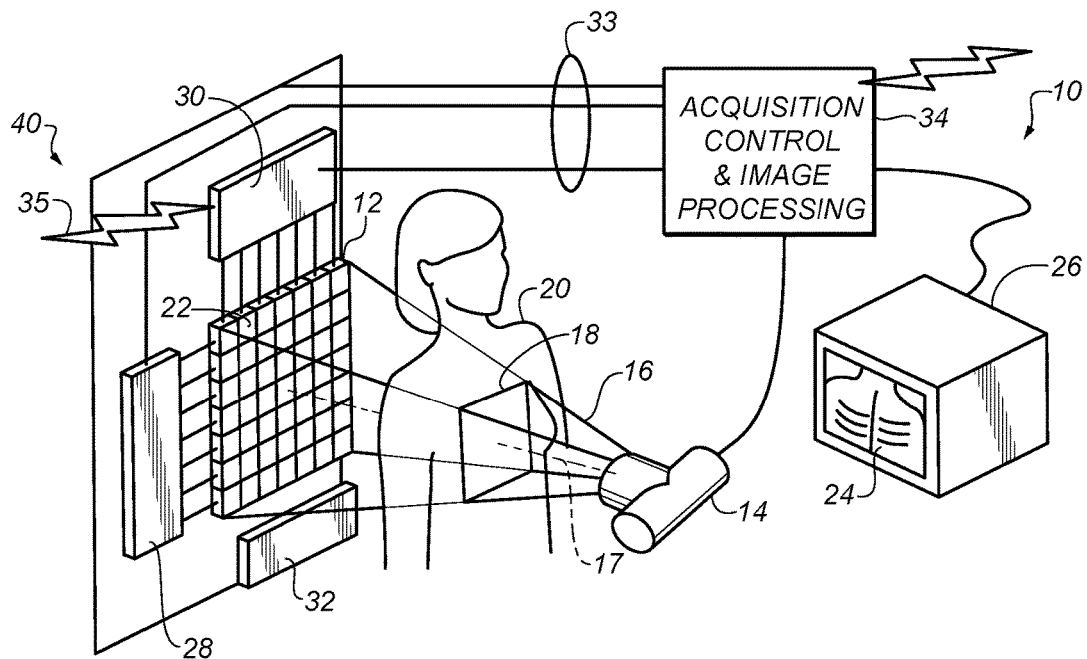
FIG. 1 illustrates an exemplary digital X-ray system in which the x-ray generator and detector are under the control of an acquisition control and image processing unit.

FIG. 1 is a perspective view of a digital radiographic (DR) imaging system 10 that includes a generally planar DR detector 40 (shown without a housing for clarity of description), an x-ray source 14 configured to generate radiographic energy (x-ray radiation), and a digital monitor 26 configured to display images captured by the DR detector 40, according to one embodiment. The DR detector 40 may include a two dimensional array 12 of detector cells 22 (photosensors), arranged in electronically addressable rows and columns. The DR detector 40 may be positioned to receive x-rays 16 passing through a subject 20 during a radiographic energy exposure, or radiographic energy pulse, emitted by the x-ray source 14. As shown in FIG. 1, the radiographic imaging system 10 may use an x-ray source 14 that emits collimated x-rays 16, e.g. an x-ray beam, selectively aimed at and passing through a preselected region 18 of the subject 20. The x-ray beam 16 may be attenuated by varying degrees along its plurality of rays according to the internal structure of the subject 20, which attenuated rays are detected by the array 12 of photosensitive detector cells 22. The planar DR detector 40 is positioned, as much as possible, in a perpendicular relation to a substantially central ray 17 of the plurality of rays 16 emitted by the x-ray source 14. The array 12 of individual photosensitive cells (pixels) 22 may be electronically addressed (scanned) by their position according to column and row. As used herein, the terms "column" and "row" refer to the vertical and horizontal arrangement of the photo sensor cells 22 and, for clarity of description, it will be assumed that the rows extend horizontally and the columns extend vertically. However, the orientation of the columns and rows is arbitrary and does not limit the scope of any embodiments disclosed herein. Furthermore, the term "subject" may be illustrated as a human patient in the description of FIG. 1, however, a subject of a DR imaging system, as the term is used herein, may be a human, an animal, an inanimate object, or a portion thereof.

In one exemplary embodiment, the rows of photosensitive cells 22 may be scanned one or more at a time by electronic scanning circuit 28 so that the exposure data from the array 12 may be transmitted to electronic read-out circuit 30. Each photosensitive cell 22 may independently store a charge proportional to an intensity, or energy level, of the attenuated radiographic radiation, or x-rays, received and absorbed in the cell. Thus, each photosensitive cell, when read-out, provides information defining a pixel of a radiographic image 24, e.g. a brightness level or an amount of energy absorbed by the pixel, that may be digitally decoded by image processing electronics 34 and transmitted to be displayed by the digital monitor 26 for viewing by a user. An electronic bias circuit 32 is electrically connected to the two-dimensional detector array 12 to provide a bias voltage to each of the photosensitive cells 22.

Each of the bias circuit 32, the scanning circuit 28, and the read-out circuit 30, may communicate with an acquisition control and image processing unit 34 over a connected cable (wired) 33, or the DR detector may be equipped with a wireless transmitter to transmit radiographic image data wirelessly 35 to the acquisition control and image processing unit 34. The acquisition control and image processing unit 34 may include a processor and electronic memory (not shown) to control operations of the DR detector 40 as described herein, including control of circuits 28, 30, and 32, for example, by use of programmed instructions. The acquisition control and image processing unit 34 may also be used to control activation of the x-ray source 14 during a radiographic exposure, controlling an x-ray tube electric current magnitude, and thus the fluence of x-rays in x-ray beam 16, and/or the x-ray tube voltage, and thus the energy level of the x-rays in x-ray beam 16.

The acquisition control and image processing unit 34 may transmit image (pixel) data to the monitor 26, based on the radiographic exposure data received from the array 12 of photosensitive cells 22. Alternatively, acquisition control and image processing unit 34 can process the image data and store it, or it may store raw unprocessed image data, in local or remotely accessible memory.

With regard to a direct detection embodiment of DR detector 40, the photosensitive cells 22 may each include a sensing element sensitive to x-rays, i.e. it absorbs x-rays and generates an amount of charge carriers in proportion to a magnitude of the absorbed x-ray energy. A switching element may be configured to be selectively activated to read out the charge level of a corresponding x-ray sensing element. With regard to an indirect detection embodiment of DR detector 40, photosensitive cells 22 may each include a sensing element sensitive to light rays in the visible spectrum, i.e. it absorbs light rays and generates an amount of charge carriers in proportion to a magnitude of the absorbed light energy, and a switching element that is selectively activated to read the charge level of the corresponding sensing element. A scintillator, or wavelength converter, is disposed over the light sensitive sensing elements to convert incident x-ray radiographic energy to visible light energy.

Examples of sensing elements used in sensing array 12 include various types of photoelectric conversion devices (e.g., photosensors) such as photodiodes (P-N or PIN diodes), photo-capacitors (MIS), photo-transistors or photoconductors. Examples of switching elements used for signal read-out include MOS transistors, bipolar transistors and other p-n junction components.

Figure 2:
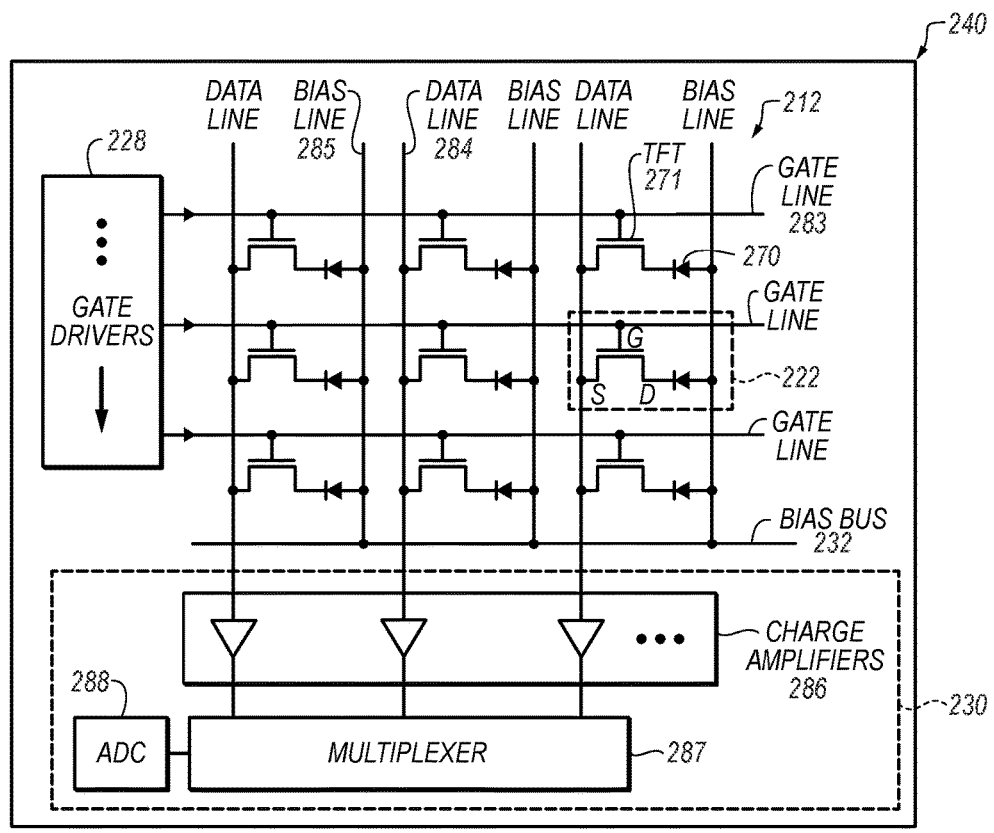
FIG. 2 is a diagram of an exemplary pixel array of a prior art detector.

FIG. 2 is a schematic diagram 240 of a portion of a two-dimensional array 12 for a DR detector 40. The array of photosensor cells 212, whose operation may be consistent with the photosensor array 12 described above, may include a number of hydrogenated amorphous silicon (a-Si:H) n-i-p photodiodes 270 and thin film transistors (TFTs) 271 formed as field effect transistors (FETs) each having gate (G), source (S), and drain (D) terminals. In embodiments of DR detector 40 disclosed herein, the two-dimensional array of photosensor cells 12 may be formed in a device layer that abuts adjacent layers of the DR detector structure. A plurality of gate driver circuits 228 may be electrically connected to a plurality of gate lines 283 which control a voltage applied to the gates of TFTs 271, a plurality of readout circuits 230 may be electrically connected to data lines 284, and a plurality of bias lines 285 may be electrically connected to a bias line bus or a variable bias reference voltage line 232 which controls a voltage applied to the photodiodes 270. Charge amplifiers 286 may be electrically connected to the data lines 284 to receive signals therefrom. Outputs from the charge amplifiers 286 may be electrically connected to a multiplexer 287, such as an analog multiplexer, then to an analog-to-digital converter (ADC) 288, or they may be directly electrically connected to the ADC, to stream out the digital radiographic image data at desired rates. In one embodiment, the schematic diagram of FIG. 2 may represent a portion of a DR detector 40 such as an a-Si:H based indirect flat panel imager as described below.

Incident x-rays, or x-ray photons, 16 are converted to optical photons, or light rays, by a scintillator, which light rays are subsequently converted to electron-hole pairs, or charges, upon impacting the a-Si:H n-i-p photodiodes 270. In one embodiment, an exemplary detector cell 222, which may be equivalently referred to herein as a pixel, may include a photodiode 270 having its anode electrically connected to a bias line 285 and its cathode electrically connected to the drain (D) of TFT 271. The bias reference voltage line 232 can control a bias voltage of the photodiodes 270 at each of the detector cells 222. The charge capacity of each of the photodiodes 270 is a function of its bias voltage and its capacitance. In general, a reverse bias voltage, e.g. a negative voltage, may be applied to the bias lines 285 to create an electric field (and hence a depletion region) across the pn junction of each of the photodiodes 270 to enhance its collection efficiency for the charges generated by incident light rays. The image signal represented by the array of photosensor cells 212 may be integrated by the photodiodes while their associated TFTs 271 are held in a non-conducting (off) state, for example, by maintaining the gate lines 283 at a negative voltage via the gate driver circuits 228. The photosensor cell array 212 may be read out by sequentially switching rows of the TFTs 271 to a conducting (on) state by means of the gate driver circuits 228. When a row of the pixels 22 is switched to a conducting state, for example by applying a positive voltage to the corresponding gate line 283, collected charge from the photodiode in those pixels may be transferred along data lines 284 and integrated by the external charge amplifier circuits 286. The row may then be switched back to a non-conducting state, and the process is repeated for each row until the entire array of photosensor cells 212 has been read out. The integrated signal outputs are transferred from the external charge amplifiers 286 to an analog-to-digital converter (ADC) 288 using a parallel-to-serial converter, such as multiplexer 287, which together comprise read-out circuit 230.

This digital image information may be subsequently processed by image processing system 34 to yield a digital image which may then be digitally stored and immediately displayed on monitor 26, or it may be displayed at a later time by accessing the digital electronic memory containing the stored image. The flat panel DR detector 40 having an imaging array as described with reference to FIG. 2 is capable of both single-shot (e.g., static, radiographic) and continuous (e.g., fluoroscopic) image acquisition.

Figure 4A:
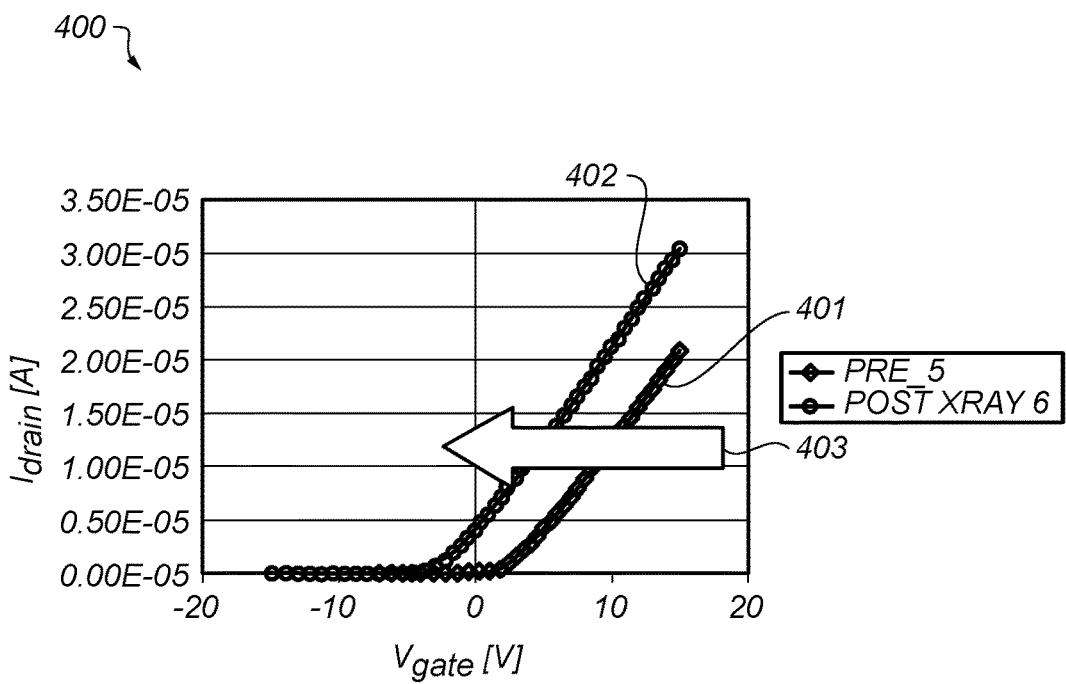
FIGS. 4A and 4B show exemplary plots of TFT characteristics due to x-ray exposure and lowered fourth terminal voltage, respectively.
Figure 4B:
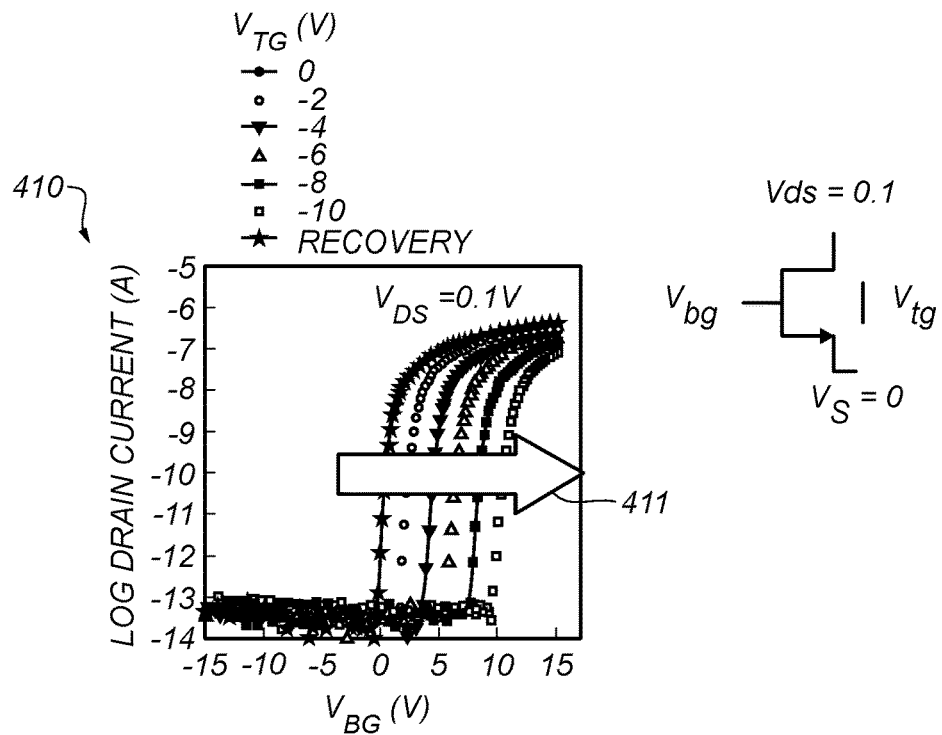

FIGS. 4A and 4B are graphs that illustrate both TFT dependence with respect to x-ray exposure, and lowering of the fourth terminal voltage of a TFT. FIG. 4A shows a plot 400 of drain current ($I_d$) vs. gate voltage ($V_g$) for a pixel pre-exposure to x-rays 401 and post-exposure to x-rays 402, showing the VT shift to the left as indicated by the arrow 403. FIG. 4B FIG. shows a plot 410 of the log of drain current vs. bottom gate voltage $V_{BG}$ for a pixel circuit with an applied top gate voltage $V_{tg}$ in increasingly negative steps of −2V, showing the VT shift to the right as indicated by the arrow 411. These figures show that lowering the fourth terminal voltage $V_{tg}$ of a TFT can effectively compensate for the inherent leftward (decreasing) VT shift due to increasing cumulative x-ray exposure.

Figure 5:
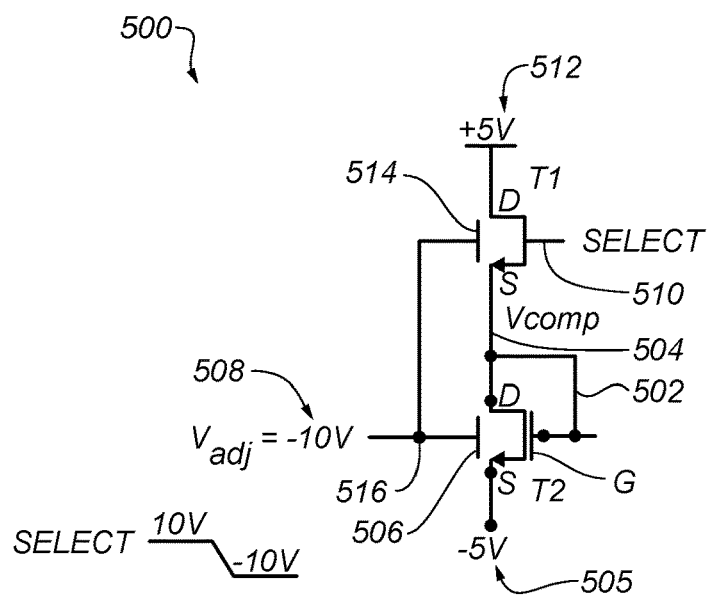
FIG. 5 is a schematic diagram of an exemplary VT compensation circuit.

FIG. 5 shows an exemplary VT compensation circuit 500. The VT compensation circuit includes two TFTs. The first TFT (T1) is configured as a switch. The second TFT (T2) is configured as a diode connected TFT wherein the GATE (G) and DRAIN (D) are electrically connected (shorted) together 502. The voltage at the Vcomp node 504 is the generated compensation voltage output that is electrically connected to the fourth terminal of a detector's pixel TFT.

Oxide TFT's have an initial process VT value close to or slightly greater than 0V. The ideal initial Vcomp voltage for the compensation circuit 500 which would electrically connect to the detector pixel TFT's fourth terminal should match the initial process VT value. Also, in the case of x-ray exposure, a left VT shift due to increased x-ray exposure would require a Vcomp voltage less than 0V for compensation. Therefore the VT compensation circuit 500 must support Vcomp voltages less than 0V.

In order to set the initial Vcomp voltage equal to the initial process VT value and support negative Vcomp values, the setting for the source (S) of T2 and fourth 506 terminal of T2 is important. The source (S) of T2 is set less than 0V by voltage source 505 allowing for Vcomp voltages less than 0V. The voltage at the fourth terminal of T2 506 is electrically connected to an externally adjustable, or variable, voltage source $V_{adj}$ 508 to ensure that the initial Vcomp voltage can be initially set to match the initial process VT value at factory setup.

In order to ensure that the Vcomp voltage is properly established even at startup conditions of a detector panel, as well as during normal operation, once the detector's power supplies are on and stable, the voltage at the gate of TFT T1 510 is turned "ON" for a period of time to allow current to flow through TFT T2 of the compensation circuit 500. When T1 is turned "ON", the Vcomp voltage will rise higher than the proper threshold voltage because the drain (D) of T1 is electrically connected to a voltage source 512 providing a positive voltage greater than the proper threshold voltage. Once T1 is turned "OFF", the Vcomp voltage will decrease to the proper VT value. This refresh cycle of turning on and off T1, using SELECT signal ±10V as shown, should occur after a detector startup procedure or power-up condition but can also occur on a periodic basis during normal operation.

In the case of x-ray exposure, as the process VT shifts to the left due to the increased x-ray exposure over the life of the detector panel, the threshold voltage compensation circuit 500 Vcomp voltage will also decrease. Since the Vcomp voltage is directly electrically connected to the fourth terminal of the detector's pixel TFT, the effective threshold voltage of the detector pixels TFTs will not change due to the compensation circuit.

The refresh cycle select signal input to the gate of TFT T1 510 can be configured in two ways. One way is to electrically connect the gate of T1 510 to the same row select signal of the detector's pixel TFT. The refresh will occur at the end of each readout phase of a row of detector pixels. This configuration also allows for semi-dual driving of the gate of the passive pixel TFT when the detector pixel TFT is "ON" since the Vcomp voltage drives higher than the proper threshold voltage. It should be noted that in the case where the fourth terminal of T1 514 is tied to the same variable voltage source 508 as the fourth terminal of T2 516, as shown in FIG. 5, the semi-dual driving gate is considered "weak". Another way to think about semi-dual driving gate is dynamic threshold voltage relaxation state for the detector's pixel TFT. The other refresh cycle approach is to electrically connect the gate of T1 510 to a common SELECT line for all pixels which can be turned on prior to the first readout row of a detector panel or after all rows have been read out or both.

Figure 6:
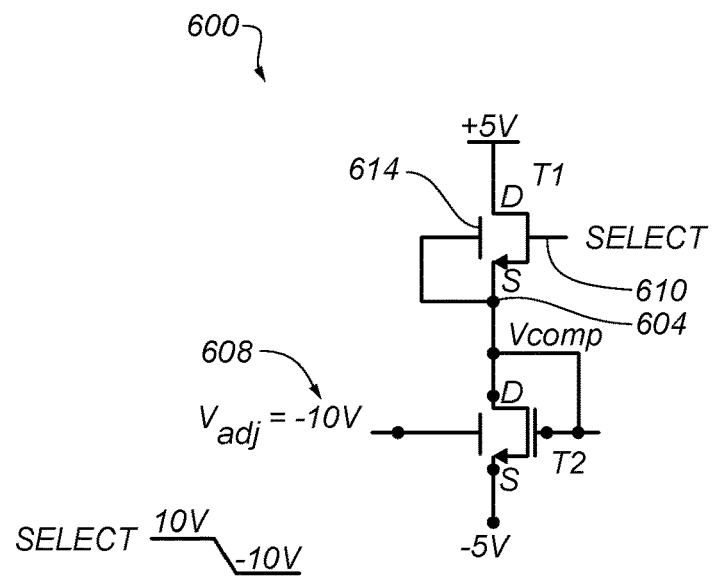
FIG. 6 is a schematic diagram of an exemplary VT compensation circuit with a self-compensation switch.

FIG. 6 shows an alternate VT compensation circuit 600 which is similar in certain respects to the embodiment of FIG. 5. Components of compensation circuit 600 that are not explained hereunder may be referenced to the description of FIG. 5 above. As shown in FIG. 6, the fourth terminal of T1 614 is not electrically connected to the adjustable voltage source 608 but rather to the Vcomp voltage node 604. In this configuration T1 is self-compensating and allows for Vcomp to act as a "strong" dual driving gate when T1 is "ON". Good TFT matching is critical in this configuration to ensure that the leakage current of T1 will not be a problem in detector applications when the SELECT signal at the T1 gate 610 is "OFF". It should be noted that in order to effectively compensate for VT shift, close TFT matching between the compensation circuit and the detector's pixel TFT may be required. In one embodiment, an in-pixel VT compensation circuit solution may be used where the compensation circuit and the detector's pixel TFT are closely spaced and see the same amount of x-ray exposure.

Figure 3:
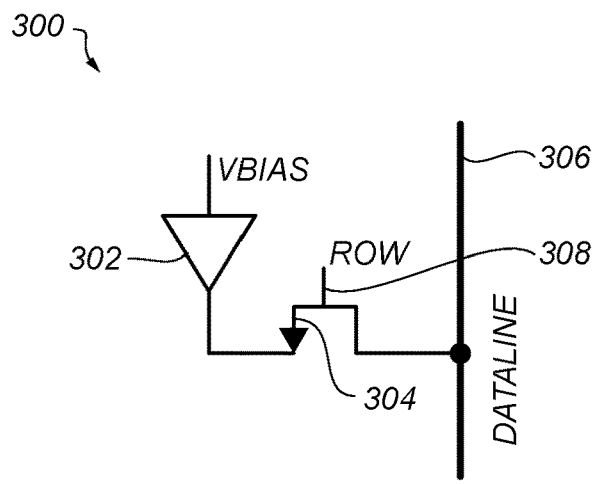
FIG. 3 is a schematic diagram of an exemplary unit pixel circuit.
Figure 7:
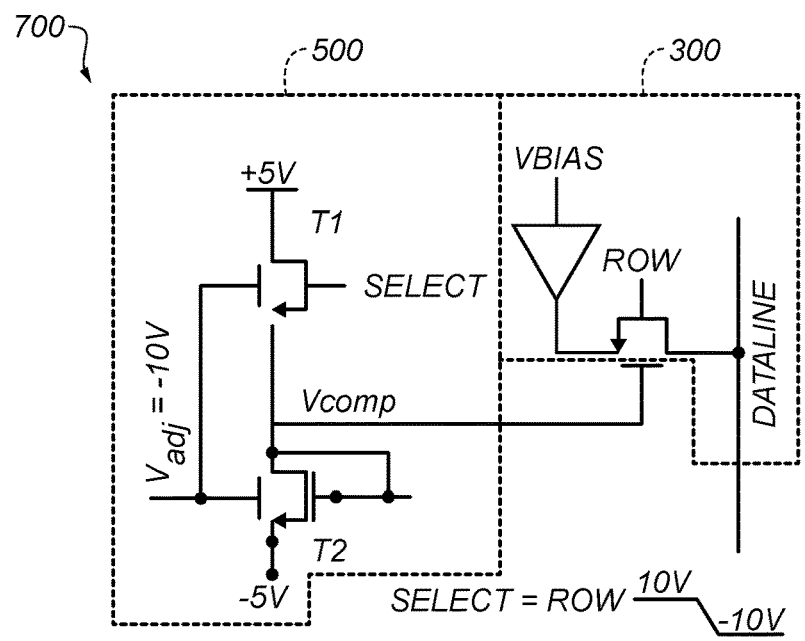
FIG. 7 is a schematic diagram of an exemplary pixel circuit with an integrated in-pixel VT compensation circuit.

In detector applications where columnation is used, pixels on the edge of the pixel array may see no x-ray exposure while the center of the array will see more exposure over the lifetime use of the detector panel. FIG. 7 shows an embodiment of a proposed detector pixel 700, using the pixel embodiment 300 of FIG. 3 and the VT compensation circuit embodiment 500 of FIG. 5, for example, whereby the Vcomp node 504 is electrically connected to the top gate of the detector pixel TFT using the variable voltage fourth terminal approach.

As will be appreciated by one skilled in the art, aspects of the present invention may be embodied as a system, circuit, or method. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pixel circuit comprising:
   scintillator material adjacent to the pixel circuit and configured to convert incident x-rays to photons;
   a photosensor for collecting charges induced therein by the photons impacting the photosensor;
   a dataline;
   a controllable switch electrically connected to the photosensor and to the dataline for controllably transmitting a signal to the dataline proportional to the amount of photon induced charges collected by the photosensor; and
   a voltage compensation circuit connected to the switch to deter a decrease of a voltage threshold of the controllable switch,
   wherein the voltage compensation circuit comprises a first TFT and a second TFT connected in series between a first voltage source and a second voltage source, and the switch is connected to a common node between the first and second TFTs.

2. The pixel circuit of claim 1, wherein the controllable switch comprises a pixel TFT, the photosensor comprises a photodiode having a cathode connected to the pixel TFT, and the common node is connected to a body of the pixel TFT.

3. The pixel circuit of claim 2, wherein the second TFT comprises a gate directly connected to its drain, and its drain is connected to the common node.

4. The pixel circuit of claim 3, wherein the voltage compensation circuit comprises a third voltage source connected to the body of the second TFT.

5. The pixel circuit of claim 4, wherein the voltage compensation circuit comprises a source of the first TFT connected to the common node and to a body of the first TFT.

6. The pixel circuit of claim 4, wherein the voltage compensation circuit comprises a third voltage source connected to the body of the first TFT and to the body of the second TFT.

7. The pixel circuit of claim 6, wherein the third voltage source comprises a variable voltage source.

8. A voltage compensation Circuit comprising:
   a first TFT;
   a second TFT, the first and second TFTs connected in series between a first voltage source and a second voltage source; and
   a third voltage source connected to the body of the second TFT,
   wherein the gate and drain of the second TFT are directly connected, and wherein a node between the first and second TFTs provides a compensation voltage.

9. The circuit of claim 8, wherein a source and body of the first TFT are directly connected.

10. The circuit of claim 8, wherein the third voltage source is connected to a body of the first TFT, and the third voltage source comprises a variable voltage source.

11. The circuit of claim 10, wherein the node between the first and second TFTs is connected to a body of a switching TFT in a pixel circuit.

12. The circuit of claim 11, wherein the switching TFT is connected between a photosensor of the pixel circuit and a data line of the pixel circuit.

13. A DR detector comprising a plurality of pixel circuits adjacent a scintillator, each of the pixel circuits comprising:

a photosensor for collecting charges induced by photons impacting the photosensor, wherein the photons impacting the photosensor are generated by x-rays impacting the scintillator;

a dataline;

a controllable switch electrically connected to the photosensor and to the dataline for controllably transmitting a signal to the dataline proportional to the amount of photon induced charges collected by the photosensor; and a voltage compensation circuit connected to the switch to deter a decrease of a voltage threshold of the controllable switch wherein the voltage compensation circuit comprises a first TFT and a second TFT connected in series between a first voltage source and a second voltage source, and the switch is connected to a common node between the first and second TFTs.

14. The DR detector of claim 13, wherein the controllable switch comprises a pixel TFT, the photosensor comprises a photodiode having a cathode connected to the pixel TFT, and the common node is connected to a body of the pixel TFT.

15. The DR detector of claim 14, wherein the second TFT comprises a gate directly connected to its drain, and its drain is connected to the common node.

16. The DR detector of claim 15, wherein the voltage compensation circuit comprises a third voltage source connected to the body of the second TFT.

17. The DR detector of claim 16, wherein the voltage compensation circuit comprises a source of the first TFT connected to the common node and to a body of the first TFT.

18. The DR detector of claim 17, wherein the voltage compensation circuit comprises a third voltage source connected to the body of the first TFT and to the body of the second TFT.

* * * * *